Patented Feb. 18, 1947

2,416,106

UNITED STATES PATENT OFFICE 2,416,106

POLYMERIZATION OF OLEFINIC HYDRO-CARBONS IN THE PRESENCE OF BORON FLUORIDE AND AN ACID FLUORIDE OF A METAL

Carl B. Linn, Riverside, and Vladimir N. Ipatieff, Chicago, Ill., assignors to Universal Oil Products Company, Chicago, Ill., a corporation of Delaware No Drawing. Application March 29, 1945, Serial No. 585,571

9 Claims. (Cl. 260—683.15)

This invention relates to the polymerization of olefinic hydrocarbons in the presence of a particular type of catalyst. More particularly, this invention relates to the polymerization of ethylene and of other gaseous olefins into normally liquid hydrocarbons boiling within the approximate range of gasoline.

An object of this invention is to produce normally liquid hydrocarbons by catalytically polymerizing ethylene and higher olefins.

One specific embodiment of this invention relates to a process which comprises reacting an olefinic hydrocarbon at polymerizing conditions in the presence of boron fluoride and an acid fluoride.

Another embodiment of this invention relates to a polymerization process which comprises reacting a normally gaseous olefin at polymerizing conditions in the presence of boron fluoride and an acid fluoride of an alkali metal.

A further embodiment of this invention relates to a process which comprises polymerizing ethylene to normally liquid hydrocarbons in the presence of boron fluoride and an acid fluoride of an alkali metal.

The catalysts hereinafter indicated are especially adapted to promote the controlled polymerization of ethylene and other normally gaseous olefins.

Normally gaseous and liquid olefinic hydrocarbons which are polymerizable by the process of the present invention occur together with paraffinic or saturated hydrocarbons in commercial hydrocarbon mixtures such as those encountered in the cracking of petroleum, in gas making processes, and as by-products of various chemical industries. Suitable olefins may be obtained also by catalytic dehydrogenation and by pyrolysis of certain paraffinic hydrocarbons. In general, olefins have a relatively high activity and even under mild catalytic influence they exhibit this activity by their pronounced tendency to polymerize and form substances of higher molecular weights.

It is known that ethylene does not polymerize at moderate temperature in the presence of pure boron trifluoride. Known promoters for ethylene polymerization in the presence of boron trifluoride include nickel-powder, water, and hydrogen fluoride. Now we have found that ethylene will undergo substantially complete conversion into normally liquid hydrocarbons even at about room temperature in the presence of boron trifluoride and an acid fluoride of an alkali metal such as potassium bifluoride. This process is also effective for converting propylene and butylenes into normally liquid polymers, and in converting amylenes, hexylenes and higher olefins into their dimers, trimers, etc. Propylene and butylenes so polymerized may occur in the gases derived from oil cracking processes or they may be utilized in relatively pure state produced by special means as by the dehydration of alcohols or by the dehydrogenation and fractionation of selected hydrocarbon mixtures. Some polymerization of propylene and butylenes occurs in the presence of pure boron trifluoride, but we prefer to employ boron trifluoride together with an acid fluoride.

The present process is particularly useful for the production of polymers containing from about 6 to about 12 carbon atoms per molecule from ethylene and also from propylene and butylenes. The preferred polymer products boil at temperatures within the approximate boiling range of commercial gasolines. These polymers containing from about 6 to about 12 carbon atoms per molecule are useful for blending with straight-run gasoline to increase its antiknock value.

Boron trifluoride alone has been used to catalyze the polymerization of isobutylene and other olefinic hydrocarbons at relatively low temperatures in the neighborhood of $-100°$ C. to produce high molecular weight polymers utilizable as synthetic elastomers. We have found, however, that at higher temperatures normally liquid hydrocarbons are produced from normally gaseous olefins in the presence of a composite catalyst comprising essentially boron trifluoride and an acid fluoride of an alkali metal.

While the polymerization reaction of our process occurs rapidly at room temperature, it may also be carried out at a temperature of from about $-50°$ to about $300°$ C. and at a pressure of from about 1 to about 200 atmospheres.

At a pressure of 1 atmosphere, boron trifluoride is a colorless gas having a boiling point of −101° C. Acid fluorides which are employed with boron trifluoride in our process are solid materials which are decomposed at relatively high temperatures into a metal fluoride and hydrogen fluoride. Acid fluorides which we prefer in our process are those of the alkali metals and include fluorides of lithium, sodium, potassium, rubidium, and caesium. The acid fluorides are sometimes referred to as hydrofluorides or bifluorides and are often represented by formulae such as the following: $KF \cdot HF$, $KF \cdot 2HF$, and $KF \cdot 3HF$. In general, the monohydrofluorides are more stable and are therefore preferred as catalyst components, but under proper operating conditions the dihydrofluorides and trihydrofluorides may be used also. The stabilities of the mono-acid fluorides or hydrofluorides of the alkali metals decrease in the following order: sodium, potassium, rubidium, and caesium. Therefore, we prefer to use the acid fluorides of sodium and potassium in our process. It will be apparent that the exact range of operating temperatures and pressures to be employed in the polymerization process will depend somewhat upon the particular acid fluoride which is employed and it should be noted therefore that the various acid fluorides are not necessarily on an equivalent basis or utilizable under exactly the same conditions of operation.

Our polymerization process may be carried out in a batch operation or preferably in continuous operation. The reaction may be carried out continuously by passing a mixture of an olefin such as ethylene and boron trifluoride over a solid acid fluoride contained in a suitable reactor, separating liquid products, and recycling the recovered boron trifluoride and any unreacted ethylene or other olefinic hydrocarbons undergoing treatment.

In another type of operation a polymerization reactor may be used comprising a mechanically agitated reaction zone in which finely divided potassium acid fluoride is agitated in the form of a slurry with the hydrocarbon reactants and boron trifluoride. It will usually be necessary to incorporate a cooling zone or other heat exchange means in the polymerization zone or between such zones if a multiple polymerization reactor system is employed.

The following example is introduced to illustrate the nature of the present invention as applied to the polymerization of ethylene.

A rotatable steel autoclave of 850 cc. capacity was charged with 15 grams of potassium bifluoride. The autoclave was then sealed and 74 grams of boron trifluoride was added thereto. The autoclave was rotated and 143 grams of ethylene was added thereto in 6 approximately equal batches over a time interval of 4 hours while the autoclave was maintained at room temperature. The adsorption of ethylene was rapid and although the autoclave was rotated for 12 hours after addition of all of the ethylene, this additional time of rotation was clearly unnecessary. After the reaction was completed the residual ethylene was released from the autoclave through caustic scrubbers, drying towers, collecting traps, and a gas meter. Upon opening the autoclave the reaction product was present in the form of two layers, the lower layer composed of sludge hydrocarbons and catalyst, while the upper layer consisted of hydrocarbons.

The operating conditions and weight balance of charge and recovered products are summarized by the following table:

TABLE I

*Polymerization of ethylene*

Conditions:
  Temperature, °C ---------------------- 25–35
  Pressure, atmospheres ---------------- 35–85
  Time, hours—
    For addition of $C_2H_4$ ----------- 4
    Additional stirring ---------------- 12
Charge, grams:
  $KHF_2$ ------------------------------ 15
  $BF_3$ ------------------------------- 74
  $C_2H_4$ ----------------------------- 143
Recovered, grams:
  $BF_3$ ------------------------------- 52
  $C_2H_4$ ----------------------------- 3
  Upper layer -------------------------- 100
  Lower layer -------------------------- 31

The upper layer consisting of liquid hydrocarbons was distilled at atmospheric pressure and separated into fractions with the properties indicated in Table II.

TABLE II

*Distillation and properties of ethylene polymerization product*

| Fraction number | B. P., °C. | Wt., per cent | $d_4^{20}$ | $n_D^{20}$ | Bromine number |
|---|---|---|---|---|---|
| 1 | Below 20 | 3.5 | (a) | | |
| 2 | 20–88 | 5.2 | 0.657 | 1.3732 | 0.5 |
| 3 | 88–119 | 4.1 | .687 | 1.3952 | 0.5 |
| 4 | 119–126 | 1.3 | | 1.4047 | |
| 5 | 126–162 | 4.9 | .723 | 1.4107 | 0.5 |
| 6 | 162–187 | 4.5 | .750 | 1.4183 | 0.5 |
| 7 | 187–200 | 2.2 | .765 | 1.4242 | 2.0 |
| 8 | 200–207 | 1.7 | .770 | 1.4272 | |
| Residue | Above 207 | 72.6 | .813 | 1.4606 | 11 |

(a) This fraction consisted of isobutane as shown by gas analysis.

The bromine number values given in Table II indicate that the lower fractions of the liquid product consisted of substantially saturated hydrocarbons. Accordingly the reaction by which the ethylene was converted into normally liquid hydrocarbons was largely conjunct polymerization. Some of the fractions of the polymer product, and particularly those of higher boiling point contained a high concentration of cyclic hydrocarbons. The lower boiling fractions, particularly those boiling below about 180° C. are suitable for use as motor gasoline while the higher boiling materials which make up a large part of the product have utility as intermediates in the manufacture of detergents and other chemical products.

The novelty and utility of this invention are evident from the preceding specification and example although neither section is intended to limit unduly the generally broad scope of the invention.

We claim as our invention:

1. A process which comprises reacting olefinic hydrocarbons at polymerizing conditions in the presence of boron trifluoride and an acid fluoride of a metal.

2. A process for producing normally liquid hydrocarbons which comprises reacting normally gaseous olefins at polymerizing conditions in the presence of boron trifluoride and an acid fluoride of a metal.

3. A process for producing normally liquid hydrocarbons which comprises reacting normally gaseous olefins at polymerizing conditions in the presence of boron trifluoride and an acid fluoride of an alkali metal.

4. A process for producing normally liquid hydrocarbons which comprises reacting ethylene at polymerizing conditions in the presence of boron trifluoride and an acid fluoride of an alkali metal.

5. A process for polymerizing an olefinic hydrocarbon which comprises reacting said hydrocarbon at a temperature of from about −50° to about 300° C. in the presence of boron trifluoride and an acid fluoride of a metal.

6. A process for polymerizing an olefinic hydrocarbon which comprises reacting said hydrocarbon at a temperature of from about −50° to about 300° C. in the presence of boron trifluoride and a hydrofluoride of an alkali metal.

7. A process for converting a normally gaseous olefinic hydrocarbon into normally liquid hydrocarbons which comprises reacting said olefinic hydrocarbon at a temperature of from about −50° to about 300° C. in the presence of boron trifluoride and a hydrofluoride of an alkali metal.

8. A process for converting ethylene into normally liquid hydrocarbons which comprises reacting ethylene at a temperature of from about −50° to about 300° C. in the presence of boron trifluoride and a hydrofluoride of an alkali metal.

9. A process for converting ethylene into normally liquid hydrocarbons which comprises reacting ethylene at a temperature of from about −50° to about 300° C. in the presence of boron trifluoride and potassium bifluoride.

CARL B. LINN.
VLADIMIR N. IPATIEFF.

REFERENCES CITED

The following references are of record in the file of this patent:

UNITED STATES PATENTS

| Number | Name | Date |
| --- | --- | --- |
| 2,085,535 | Langedijk | June 29, 1937 |
| 2,186,022 | Holm | Jan. 9, 1940 |
| 2,253,323 | Christmann | Aug. 19, 1941 |
| 2,270,292 | Grosse | Jan. 20, 1942 |
| 2,286,129 | Veltman | June 9, 1942 |
| 2,366,736 | Linn et al. | Jan. 9, 1945 |